United States Patent
Zhang et al.

(10) Patent No.: US 10,720,637 B2
(45) Date of Patent: Jul. 21, 2020

(54) POSITIVE ELECTRODE AND METHOD FOR MAKING THE SAME, AND BATTERY USING THE SAME

(71) Applicants: Tsinghua University, Beijing (CN); HON HAI PRECISION INDUSTRY CO., LTD., New Taipei (TW)

(72) Inventors: Yue-Gang Zhang, Beijing (CN); Lu-Jie Jia, Beijing (CN); Jian Wang, Yancheng (CN); Yang Wu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 16/177,447

(22) Filed: Nov. 1, 2018

(65) Prior Publication Data
US 2020/0067073 A1 Feb. 27, 2020

(30) Foreign Application Priority Data
Aug. 24, 2018 (CN) .......................... 2018 1 0974175

(51) Int. Cl.
*H01M 4/133* (2010.01)
*H01M 10/0525* (2010.01)
(Continued)

(52) U.S. Cl.
CPC ......... *H01M 4/133* (2013.01); *H01M 4/0471* (2013.01); *H01M 10/0525* (2013.01); *H01M 2004/028* (2013.01)

(58) Field of Classification Search
None
See application file for complete search history.

(56) References Cited

U.S. PATENT DOCUMENTS 8,648,004 B2   2/2014  Kuo et al.
9,960,466 B2   5/2018  Yin et al.
(Continued)

FOREIGN PATENT DOCUMENTS

| CN | 107732220 | * | 2/2018 |
| JP | 2014-015370 | | 1/2014 |

(Continued)

OTHER PUBLICATIONS

CN107732220 English translation. Zhang et al. China. Feb. 23, 2018. (Year: 2018).*

(Continued)

*Primary Examiner* — Christopher P Domone
(74) *Attorney, Agent, or Firm* — ScienBiziP, P.C.

(57) ABSTRACT

A method for making a positive electrode includes the following steps: dispersing a plurality of carbon nanotubes in water, to form a carbon nanotube dispersion; adding an aniline solution into the carbon nanotube dispersion, to form a mixed solution; adding an initiator into the mixed solution, to form a carbon nanotube composite structure preform; freeze-drying the carbon nanotube composite structure preform in a vacuum environment; carbonizing the carbon nanotube composite structure preform in a protective gas after freeze-drying, to form a carbon nanotube composite structure; and adding a positive electrode active material into the carbon nanotube composite structure. The present application also relates to the positive electrode and a battery including the positive electrode.

20 Claims, 19 Drawing Sheets

(51) Int. Cl.
*H01M 4/04* (2006.01)
*H01M 4/02* (2006.01)

(56) References Cited

U.S. PATENT DOCUMENTS

| | | |
|---|---|---|
| 2012/0258850 A1 | 10/2012 | Kuo et al. |
| 2014/0342233 A1* | 11/2014 | Guo .............. H01M 4/139 429/231.4 |
| 2014/0342234 A1* | 11/2014 | Guo .............. H01M 4/583 429/231.4 |
| 2016/0009558 A1* | 1/2016 | Luo .............. C23C 16/045 427/560 |
| 2017/0358800 A1* | 12/2017 | Sun .............. H01M 4/1397 |
| 2020/0028179 A1* | 1/2020 | He .............. H01M 4/366 |

FOREIGN PATENT DOCUMENTS

| | | |
|---|---|---|
| TW | 201240916 | 10/2012 |
| TW | 201601991 A | 1/2016 |
| TW | 201616717 | 5/2016 |

OTHER PUBLICATIONS

Zhao Yan et al., 3D-Hybrid Material Design with Electron/Lithium-Ion Dual-Conductivity for High-Performance Li-Sulfur Batteries, Journal of Power Sources, 2017, 160-166, vol. 340.

* cited by examiner

POSITIVE ELECTRODE AND METHOD FOR MAKING THE SAME, AND BATTERY USING THE SAME

CROSS-REFERENCE TO RELATED APPLICATIONS

This application is related to commonly-assigned application entitled, "CARBON NANOTUBE COMPOSITE STRUCTURE AND METHOD FOR MAKING THE SAME", concurrently filed. Disclosures of the above-identified applications are incorporated herein by reference.

FIELD

The present application relates to a positive electrode and a method for making the same, and a battery using the same.

BACKGROUND

Carbon nanotubes can be composed of a number of coaxial cylinders of graphite sheets, and have recently attracted a great deal of attention for use in different applications, such as field emitters, chemical sensors, battery, and so on. With the development of lithium/sulfur (Li/S) battery, the application of carbon nanotubes in the Li/S battery is a research hotspot.

The Li/S battery is a lithium battery with sulfur as the positive electrode and lithium as the negative electrode. The working mechanism of the Li/S battery is different from that of the lithium ion battery, the former is the electrochemical mechanism, and the latter is lithium ion intercalation-deintercalation mechanism. The Li/S battery is considered to be one of the most promising candidates for next-generation energy storage devices because of its high theoretical specific energy (2600 $Whkg^{-1}$) and abundant resources. However, the low sulfur utilization and rapid capacity fading causes the Li/S battery to have the short cycle lifetime, thereby preventing the Li/S battery from commercialization. At present, the carbon nanotubes can be used as a current collector of a battery, but the mechanical property, the electrical property, and the chemical property of the carbon nanotubes are insufficient to solve the above problems.

Therefore, there is room for improvement in the art.

BRIEF DESCRIPTION OF THE DRAWINGS

Implementations of the present technology will now be described, by way of example only, with reference to the attached figures, wherein.

DETAILED DESCRIPTION

Figure 1:
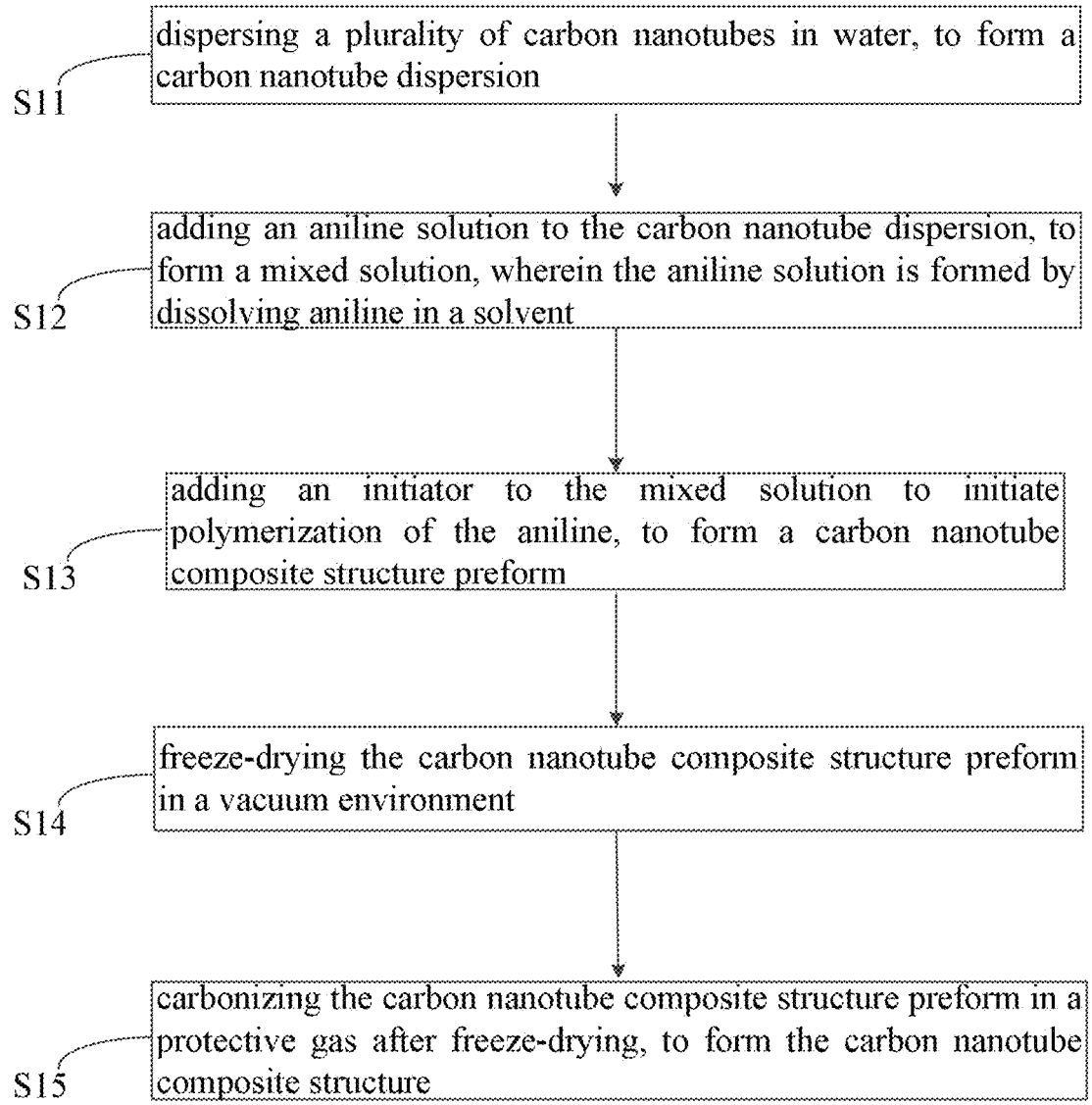
FIG. 1 is a process flow of a first embodiment of a method for making a carbon nanotube composite structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 9:
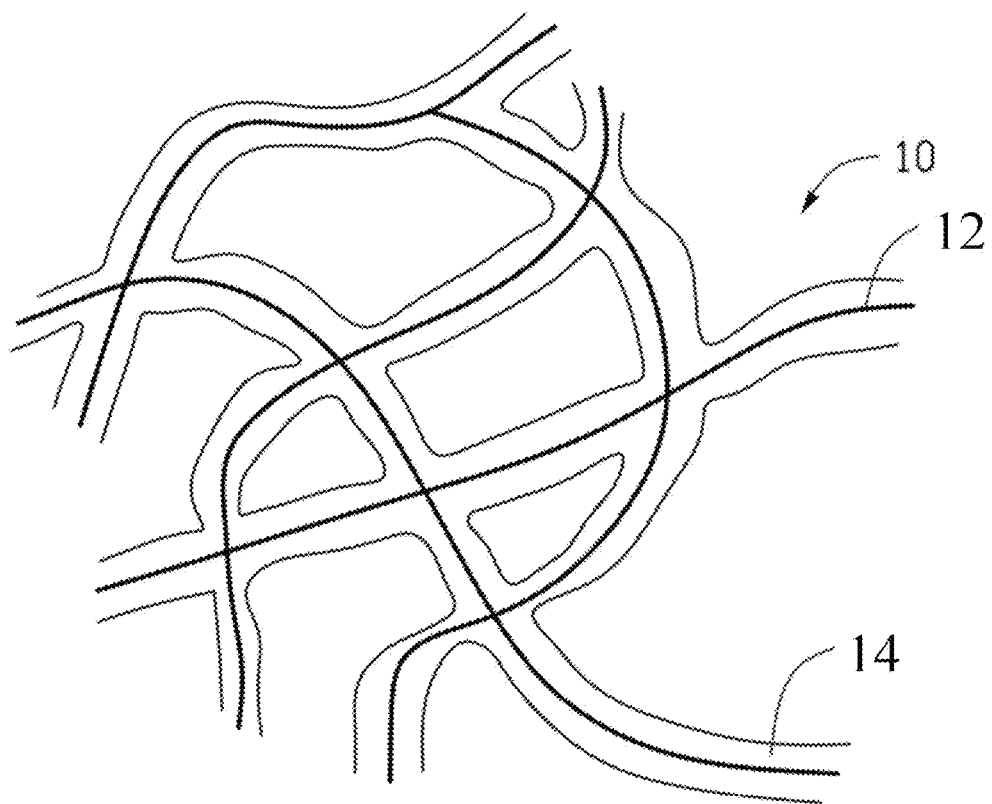
FIG. 9 schematically shows the carbon nanotube composite structure prepared by the method of FIG. 1.

The disclosure is illustrated by way of example and not by way of limitation in the figures of the accompanying drawings in which like references indicate similar elements. It should be noted that references to "an" or "one" embodi- FIG. 1 and FIG. 9 show a method for making a carbon nanotube composite structure 10 of a first embodiment, and the method includes one or more of the following steps:

S11, dispersing a plurality of carbon nanotubes 12 in water, to form a carbon nanotube dispersion;

S12, adding an aniline solution to the carbon nanotube dispersion, to form a mixed solution, wherein the aniline solution is formed by dissolving aniline in a solvent;

S13, adding an initiator to the mixed solution to initiate polymerization of the aniline, to form a carbon nanotube composite structure preform;

S14, freeze-drying the carbon nanotube composite structure preform in a vacuum environment; and S15, carbonizing the carbon nanotube composite structure preform in a protective gas after freeze-drying, to form the carbon nanotube composite structure 10.

During step S11, the carbon nanotubes 12 may be single-walled, double-walled, multi-walled carbon nanotubes, or their combinations. The diameters of the carbon nanotubes 12 range from about 20 nanometers (nm) to about 30 nm. In one embodiment, the lengths of the carbon nanotubes 12 are greater than 100 microns. In another embodiment, the lengths of the carbon nanotubes 12 are greater than 300 microns. In one embodiment, the surface of the carbon nanotube 12 is pure and free of impurities, and has not undergone any chemical modification. The impurities or chemical modification would destroy the bonding force between the carbon nanotubes 12.

The method for making the carbon nanotubes 12 includes the following steps: growing a carbon nanotube array including the carbon nanotubes 12 on a growth substrate; and separating the carbon nanotubes 12 from the growth substrate by a knife or other tool. In one embodiment, the carbon nanotube array is a super-aligned carbon nanotube array. In the super-aligned carbon nanotube array, the carbon nanotubes 12 substantially have the same length direction, and the lengths of the carbon nanotubes 12 are greater than 300 microns. The super-aligned carbon nanotube array is essentially free of impurities such as carbonaceous or residual catalyst particles.

The water can be pure water. The carbon nanotubes 12 can be dispersed in the water by ultrasonically agitating or the like. After dispersing the carbon nanotubes 12 in the water, the carbon nanotubes 12 are substantially uniformly distributed in the water to form a flocculent structure. In the flocculent structure, the carbon nanotubes 12 are not separated apart from each other, but entangled and attracted to each other. The flocculent structure has a plurality of pores, and the plurality of pores are filled with water. During the process of ultrasonically agitating, a power of the ultrasonic wave can range from about 300 watts (W) to about 1500 W, and a time of ultrasonically agitating can range from about 10 minutes to about 60 minutes. In order to effectively disperse the carbon nanotubes 12 in the water, a surfactant can be added into the water. The type of the surfactant is not limited, such as, fatty acid glycerides, stearic acid, polyvinylpyrrolidone, or the like. In one embodiment, the power of the ultrasonic wave ranges from about 500 W to about 1200 W, and the surfactant is polyvinylpyrrolidone.

Although the dispersion effect of the carbon nanotubes 12 in an organic solvent is better than that in water, the freezing point of the organic solvent is generally lower than −100 degrees Celsius. Thus, it is difficult to freeze-dry the carbon nanotube composite structure preform. Thus, the carbon nanotubes 12 are dispersed in water so that the pores of the carbon nanotube composite structure preform are filled with water, thereby facilitating freeze-drying the carbon nanotube composite structure preform.

During step S12, the solvent can dissolve the aniline, and the solvent can be hydrochloric acid, ethanol, or the like. In one embodiment, the aniline is first dissolved in ultrapure water to form the aniline ultrapure water solution, and then hydrochloric acid is added into the aniline ultrapure water solution, to form the aniline solution.

During step S13, the aniline is polymerized under the action of the initiator to form the polyaniline. The carbon nanotube composite structure preform includes the carbon nanotubes 12, the initiator, the solvent, and the water. The polyaniline is attached on the outer surface of each carbon nanotube 12. In one embodiment, the carbon nanotube composite structure preform has a hydrogel shape. The material of the initiator is not limited as long as the aniline can be polymerized under the action of the initiator. The initiator can be ammonium persulphate or the like. In one embodiment, the ammonium persulphate is dissolved in water to form an ammonium persulphate aqueous solution, and the ammonium persulphate aqueous solution is added into the mixed solution.

During step S14, freeze-drying the carbon nanotube composite structure preform in the vacuum environment includes the following sub-steps:

S141, placing the carbon nanotube composite structure preform into a freeze drier, and rapidly cooling the carbon nanotube composite structure preform to a temperature lower than −50 degrees Celsius; and S142, creating a vacuum in the freezer drier and increasing the temperature of the carbon nanotube composite structure preform to a room temperature in gradual stages, wherein a time of drying in different stages ranges from about 1 hour to about 10 hours, and the vacuum degree in the freeze drier ranges from about 1 Pa to about 10 Pa.

Figure 2:
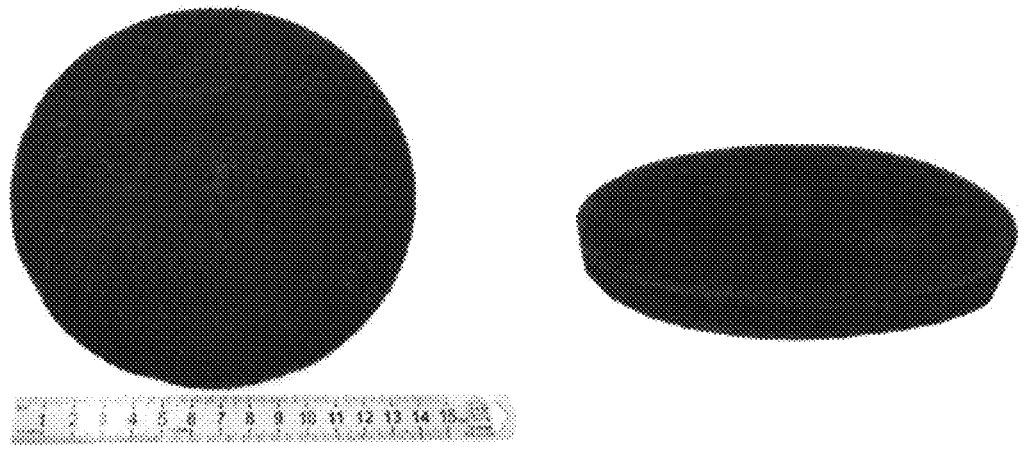
FIG. 2 shows an optical image of the first embodiment of a CNT/PANI foam.

The step of freeze-drying the carbon nanotube composite structure preform in the vacuum environment can prevent the carbon nanotube composite structure preform from collapsing, to form a sponge-like structure. The carbon nanotube composite structure preform is freeze-dried to form a CNT/PANI foam, as shown in FIG. 2. The terms "CNT/PANI" represents a composite structure formed by the carbon nanotubes 12 and the polyaniline. The CNT/PANI foam is a sponge. The CNT/PANI foam includes the carbon nanotubes 12, and each carbon nanotube 12 is coated with the polyaniline. In one embodiment, the polyaniline coats the outer surface of each carbon nanotube 12.

During step S15, the polyaniline and the initiator are carbonized under the protective gas. The protective gas is an inert gas, and the inert gas can be argon gas or the like. The carbonization temperature ranges from about 800 degrees Celsius to about 1200 degrees Celsius. The carbon nanotubes 12 are not carbonized because of the presence of the protective gas. In one embodiment, the polyaniline and the ammonium persulphate (initiator) are carbonized to form a sulfur, nitrogen-codoped carbon (SNC) layer 14. The SNC layer 14 is located on the outer surface of each carbon nanotube 12. Thus, the carbon nanotube composite structure 10 includes the carbon nanotubes 12, and the SNC layer 14 is coated on outer surface of each carbon nanotube 12.

The ammonium persulphate is not only used as the initiator, but also used as a dopant source of the nitrogen element and the sulfur element. In process of carbonizing, the ammonium persulphate is chemically converted to the nitrogen element and the sulfur element, and the in situ polymerized polyaniline is chemically converted to nitrogen-doped carbon element. The amorphous SNC layer 14 is formed on each carbon nanotube 12, to obtain a coaxial carbon skeleton. Thus, the carbon nanotube composite structure 10 is a solid and stable "bird's nest" carbon frame structure.

Hereinafter, in the first embodiment, a specific example of the method for making the carbon nanotube composite structure 10 and a comparative example are described.

Specific Example

The 100 mg carbon nanotubes 12 from the super-aligned carbon nanotube array and 15 mg polyvinylpyrrolidone (PVP K90) are dispersed in ultrapure water and effectively sonicated for 30 min, to form an uniform carbon nanotube dispersion. Then the carbon nanotube dispersion is placed into a three-necked bottle with ice bath cooling, and magnetic stirring the carbon nanotube dispersion immediately. The 150 µL aniline (ANI, J&K Scientific, 98.5%) is dissolved in 20 mL ultrapure water, to form an aniline aqueous solution. The 5 mL HCL (0.1 $molL^{-1}$) was added in the aniline aqueous solution, to form an aniline solution. The aniline solution is slowly added into the carbon nanotube dispersion, and continuously stirring for 30 minutes after adding the aniline solution. Then the 50 mL ammonium persulphate aqueous solution (ammonium persulphate: 368 mg) is dropwise added under vigorous stirring and nitrogen flow. After stirring for 24 hours, the CNT/PANI hydrogel is formed. The CNT/PANI hydrogel is placed into a petri-dish (diameter: 140 mm) and freezing-drying for several days, to form the CNT/PANI foam. The temperature of freezing-drying is about −76 degrees Celsius, and the vacuum degree is about 1 Pa. Finally, the CNT/PANI foam is placed in a tube furnace and is carbonized at a high temperature under an argon flow, the temperature is slowly increased, and the heating rate is about 3 degrees Celsius per minute. The specific process is as follows: the temperature is raised to 275 degrees Celsius from room temperature, and pre-carbonized for 1 hour; then raised to 900 degrees Celsius, and completely carbonized for 3 hours; finally, after cooling to room temperature, the carbon nanotube composite structure 10 is formed.

Comparative Example

The 100 mg carbon nanotubes 12 from the super-aligned carbon nanotube array and 15 mg polyvinylpyrrolidone (PVP K90) are dispersed in ultrapure water and effectively sonicated for 30 min, to form the uniform carbon nanotube dispersion. Then the carbon nanotube dispersion is placed into a three-necked bottle with ice bath cooling, and magnetic stirring the carbon nanotube dispersion immediately. Then the carbon nanotube dispersion is placed into a petri-dish (diameter: 140 mm) and freezing-drying for several days, to form a CNT foam. The temperature of freezing-drying is about −76 degrees Celsius, and the vacuum degree is about 1 Pa.

The comparative example is similar to the specific example of the method for making the carbon nanotube composite structure 10 above except that the comparative example does not include the steps of adding the aniline solution and the ammonium persulphate aqueous solution, and also does not include the step of carbonization.

Figure 3:
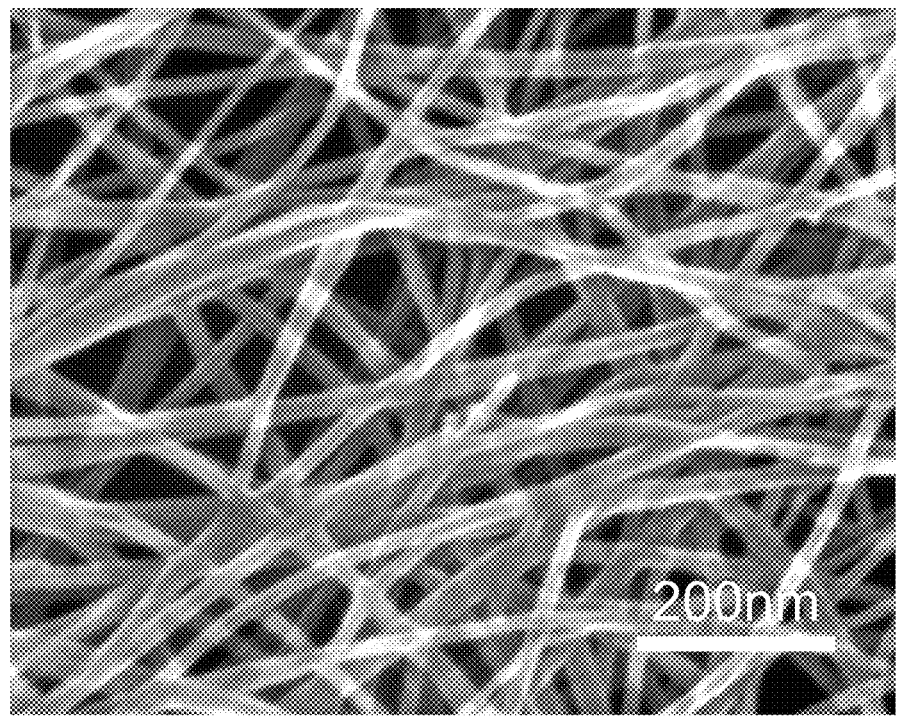
FIG. 3 shows a scanning electron microscope (SEM) image of the first embodiment of a CNT foam.
Figure 4:
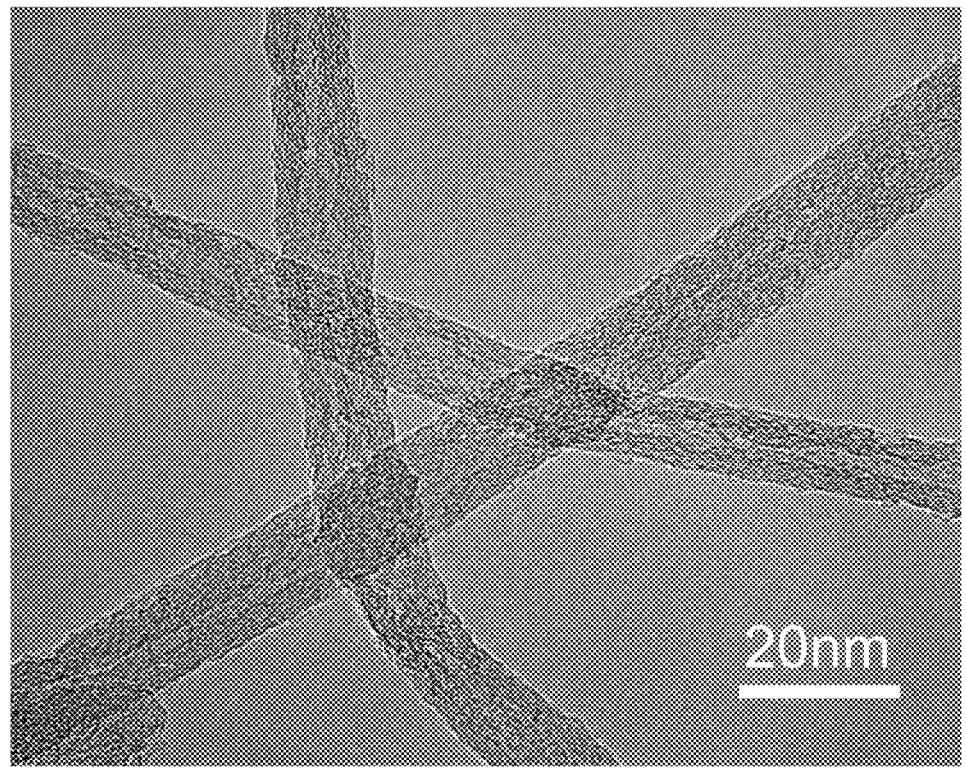
FIG. 4 shows a transmission electron microscope (TEM) image of the first embodiment of the CNT foam.
Figure 5:
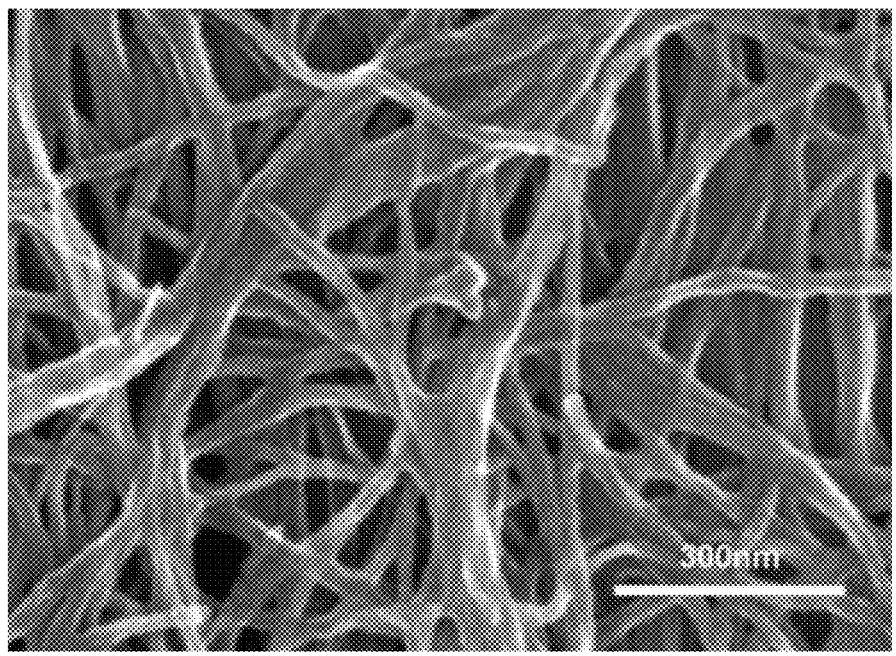
FIG. 5 shows a SEM image of the carbon nanotube composite structure prepared by the method of FIG. 1.
Figure 6:
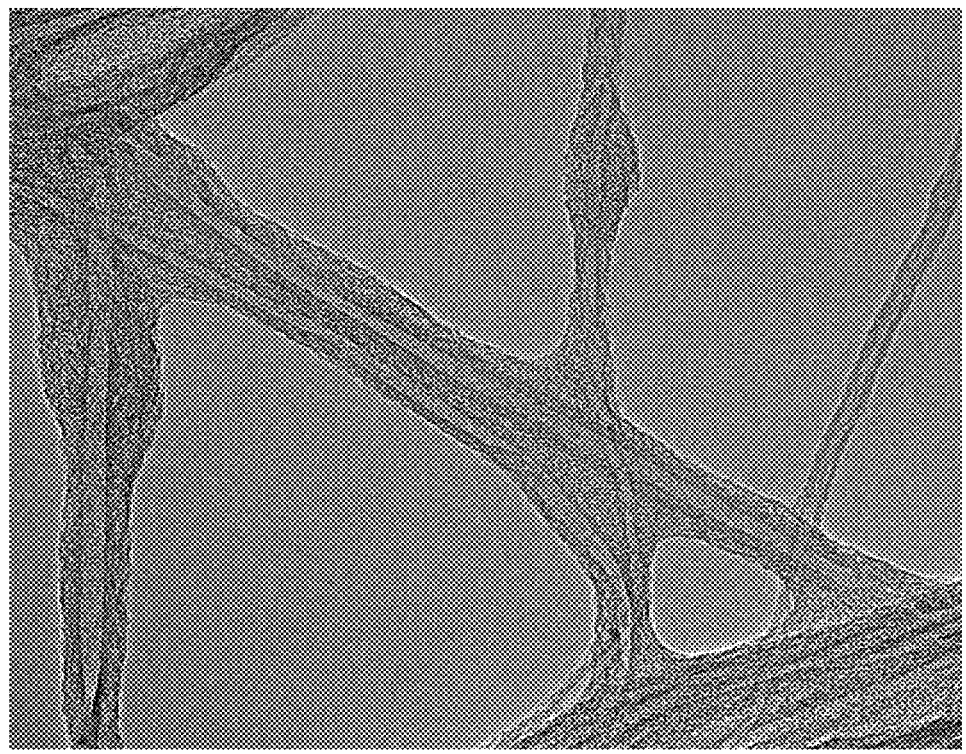
FIG. 6 shows a TEM image of the carbon nanotube composite structure prepared by the method of FIG. 1.
Figure 7:
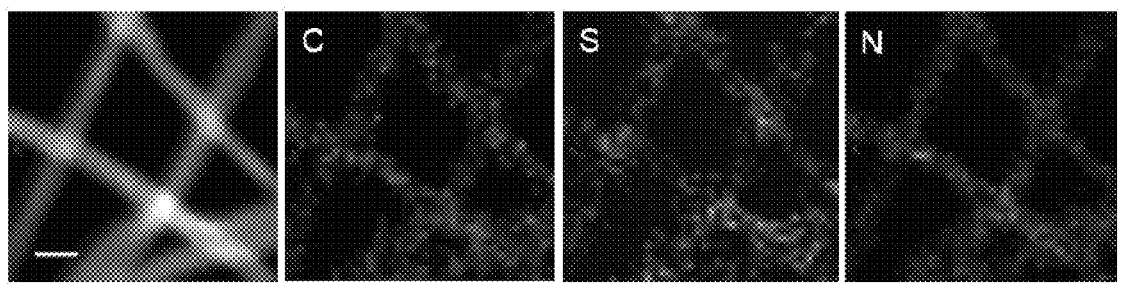
FIG. 7 shows an energy dispersive spectroscopy (EDS) image of the carbon nanotube composite structure prepared by the method of FIG. 1.

FIG. 3 shows a scanning electron microscope (SEM) image of the CNT foam of the comparative example. FIG. 4 shows a transmission electron microscope (TEM) image of the CNT foam of the comparative example. FIG. 5 shows a SEM image of the carbon nanotube composite structure 10 of the specific example. FIG. 6 shows a TEM image of the carbon nanotube composite structure 10 of the specific example. Comparing FIG. 3 and FIG. 5, and comparing FIG. 4 and FIG. 6, it can be seen that the outer surface of the carbon nanotube 12 is coated with a coating. FIG. 7 is an EDS spectrum of the carbon nanotube composite structure 10. Seen from FIG. 7, the coating includes carbon (C) element, nitrogen (N) element, and sulfur (S) element. Thus, the coating is the sulfur, nitrogen-codoped carbon (SNC) layer 14. The ratio of the carbon (C) element, nitrogen (N) element, and sulfur (S) element, and the thickness of the SNC layer 14 can be controlled by the amount of aniline and the initiator, such as by the mass fraction of each substance and concentration of the solvent. In one embodiment, the analysis results of the X-ray photoelectron spectroscopy (XPS) shows that the atomic percentage of the carbon (C) element, nitrogen (N) element, and sulfur (S) element in the carbon nanotube composite structure 10 is C:N:S=95.4%: 3.2%:1.4%.

Furthermore, seen from FIG. 5 and FIG. 6, the intersections of multiple carbon nanotubes 12 are bonded by the SNC layer 14, improving the stability of the carbon nanotube composite structure 10 and introducing more active sites. Moreover, FIG. 5 and FIG. 6 show that the carbon nanotube composite structure 10 has a carbon nanotube network structure. The strong carbon nanotube conductive network structure is essential for high sulfur loading and rapid charge transferring. The strong carbon nanotube conductive network structure is capable of mitigating volume expansion of the electrode active material during lithiation process, and is capable of withstanding mechanical bending and folding of the electrode.

Figure 8:
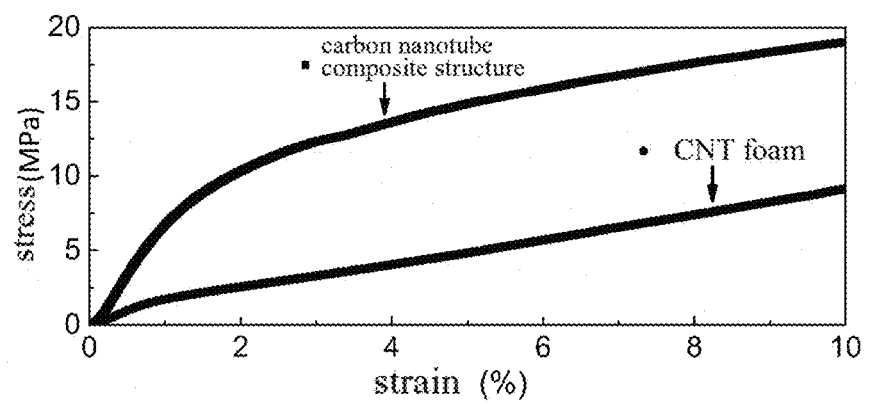
FIG. 8 shows stress-strain curves of the carbon nanotube composite structure prepared by the method of FIG. 1 and the CNT foam.

FIG. 8 shows the mechanical test results of the carbon nanotube composite structure 10 and the CNT foam. Seen from FIG. 8, the strain of the carbon nanotube composite structure 10 is almost five times that of the CNT foam in the range of 2% relative displacement. Seen from FIG. 8, after the initial displacement, the two curves have the same slope. This indicates that the carbon nanotube composite structure 10 changes from elastic deformation to plastic deformation. This phenomenon can be explained by the fact: the SNC layer 14 has fastening or bonding function at the intersection of multiple carbon nanotubes 12 during the initial stretching; with further stretching, excessive stress weakens the fastening or bonding function of the SNC layer 14, causing the elastic deformation to transform into plastic deformation.

Due to the bonding of the SNC layer 14, the ability of carbon nanotube composite structure 10 to resist deformation is far greater than the ability of CNT foam to resist deformation. The carbon nanotube composite structure 10 and the CNT foam are respectively cut into strips having a width of 8 mm to 10 mm and a length greater than 1 cm, and then the strips are pulled by a mechanical tester (Instron MicroTester 5848). The tensile rate under a 20 N load is 1% strain rate per minute. The tensile test shows that the Young's modulus of the carbon nanotube composite structure 10 is 810.12 MPa, and the Young's modulus of the pure CNT foam is only 106.82 MPa.

Referring to FIG. 9, the carbon nanotube composite structure 10 in the first embodiment includes a carbon nanotube network structure and the SNC layer 14. The carbon nanotube network structure includes the plurality of carbon nanotubes 12 entangled to each other. The plurality of pores is formed between the plurality of carbon nanotubes 12. The SNC layer 14 is coated on the outer surface of the each carbon nanotube 12. In one embodiment, the SNC layer 14 covers almost the entire outer surface of each carbon nanotube 12. The SNC layers 14 are integrated at the junction of two adjacent carbon nanotubes 12. The intersected carbon nanotubes 12 are bonded together by the SNC layers 14. Thus, the multiple carbon nanotubes 12 are firmly combined so that the carbon nanotube composite structure 10 does not collapsed. When the SNC layer 14 is coated on the outer surface of each carbon nanotube 12, the carbon nanotube composite structure 10 still has multiple pores. Since the carbon nanotube composite structure 10 has multiple pores, the carbon nanotube composite structure 10 has a large specific surface area and good elasticity, and is a complete elastic body. The SNC layer 14 includes three elements, such as carbon (C), nitrogen (N), and sulfur (S). In one embodiment, the SNC layer 14 consists of three elements of carbon (C), nitrogen (N), and sulfur (S).

Figure 10:
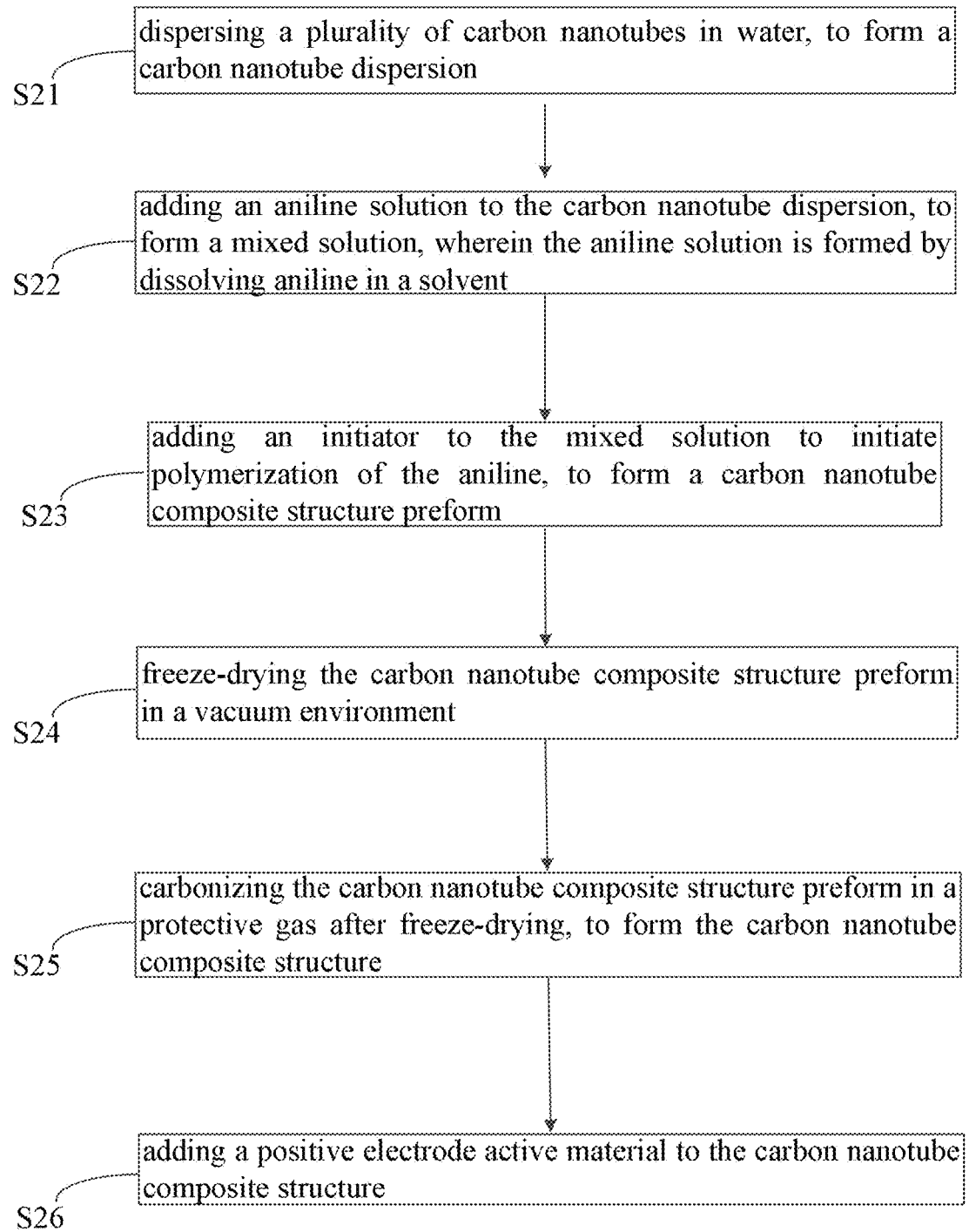
FIG. 10 is a process flow of a second embodiment of a method for making a positive electrode.
Figure 11:
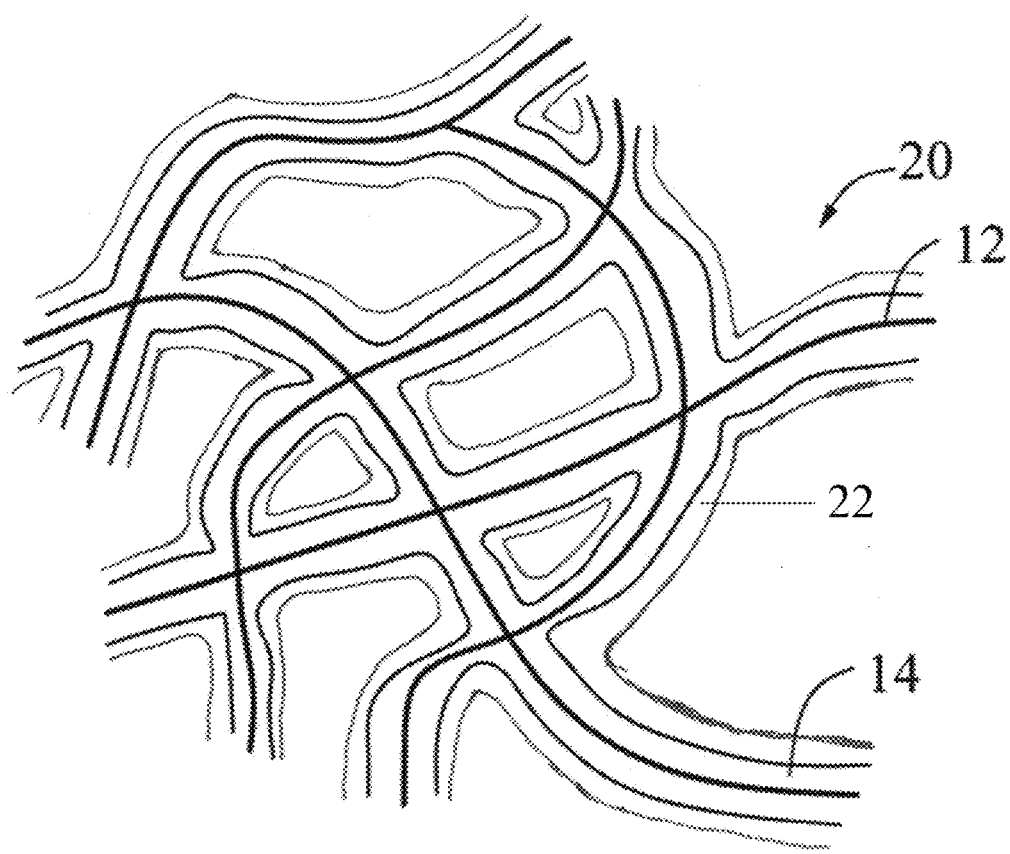
FIG. 11 schematically shows the positive electrode prepared by the method of FIG. 10.

FIG. 10 and FIG. 11 shows a method for making a positive electrode 20 of a second embodiment, and the method includes one or more of the following steps:

S21, dispersing a plurality of carbon nanotubes 12 in water, to form a carbon nanotube dispersion;

S22, adding an aniline solution to the carbon nanotube dispersion, to form a mixed solution, wherein the aniline solution is formed by dissolving aniline in a solvent;

S23, adding an initiator to the mixed solution to initiate polymerization of the aniline, to form a carbon nanotube composite structure preform;

S24, freeze-drying the carbon nanotube composite structure preform in a vacuum environment;

S25, carbonizing the carbon nanotube composite structure preform in a protective gas after freeze-drying, to form the carbon nanotube composite structure 10; and S26, adding a positive electrode active material to the carbon nanotube composite structure 10.

The method for making the positive electrode 20 of the second embodiment is similar to the method for making the carbon nanotube composite structure 10 of the first embodiment above except that the method for making the positive electrode 20 further includes a step of adding the positive electrode active material to the carbon nanotube composite structure 10.

During step S26, adding the positive electrode active material to the carbon nanotube composite structure 10 includes the following sub-steps:

S261, dissolving the positive electrode active material in an organic solvent, to form a positive electrode active material solution;

S262, adding the positive electrode active material solution to the carbon nanotube composite structure 10; and S263, removing the organic solvent.

During step S261, the type of the positive electrode active material is not limited. In one embodiment, the positive electrode active material is a polysulfide, sulfur, or lithium sulfide. The polysulfide can be $Li_2S_6$ or $Li_2S_8$. In one embodiment, the positive electrode active material is $Li_2S_8$, and the organic solvent is 1, 2-dimethoxyethane and 1, 3-dioxolane mixture.

During step S262, the positive electrode active material solution is dropped into the carbon nanotube composite structure 10. During step S263, the method for removing the organic solvent is not limited, for example, the organic solvent is evaporated by heating.

Hereinafter, in the second embodiment, a specific example of the method for making the positive electrode 20 and a comparative example are described.

Specific Example

The 100 mg carbon nanotubes 12 from the super-aligned carbon nanotube array and 15 mg polyvinylpyrrolidone (PVP K90) are dispersed in ultrapure water and effectively sonicated for 30 min, to form the uniform carbon nanotube dispersion. Then the carbon nanotube dispersion is placed into a three-necked bottle with ice bath cooling, and magnetic stirring the carbon nanotube dispersion immediately. The 150 μL aniline (ANI, J&K Scientific, 98.5%) is dissolved in 20 mL ultrapure water, to form an aniline aqueous solution. The 5 mL HCL (0.1 $molL^{-1}$) was added in the aniline aqueous solution, to form an aniline solution. The aniline solution is slowly added into the carbon nanotube dispersion, and continuously stirring for 30 minutes after adding the aniline solution. Then the 50 mL ammonium persulphate aqueous solution (ammonium persulphate: 368 mg) is dropwise added under vigorous stirring and nitrogen flow. After stirring for 24 hours, the CNT/PANI hydrogel is formed. The CNT/PANI hydrogel is placed into the petri-dish (diameter: 140 mm) and freezing-drying for several days, to form the CNT/PANI foam. The temperature of freezing-drying is about −76 degrees Celsius, and the vacuum degree is about 1 Pa. Finally, the CNT/PANI foam is placed in the tube furnace and is carbonized at the high temperature under the argon flow, the temperature is slowly increased, and a heating rate is about 3 degrees Celsius per minute. The specific process is as follows: the temperature is raised to 275 degrees Celsius from room temperature, and pre-carbonized for 1 hour; then raised to 900 degrees Celsius, and completely carbonized for 3 hours; finally, after cooling to room temperature, the carbon nanotube composite structure 10 is formed.

The 20 mL 1, 2-dimethoxyethane/1, 3-dioxolane (DME/DOL, volume ratio 1:1) is placed in a flask. Then, according to the equation $Li_2S+7S \rightarrow Li_2S_8$, the commercial sulfur (1444 mg) and corresponding stoichiometric lithium sulfide powder ($Li_2S$, 276 mg) are placed in the flask. Then the flask is placed in a glove box that filled with argon gas. The solution in the flask is magnetically stirred at 50 degrees Celsius for 12 hours, and the two reactants completely react, to obtain 0.3 $molL^{-1}$ $Li_2S_8$ solution (positive electrode active material, brown). The carbon nanotube composite structure 10 (diameter: 10 mm, average mass: 1.6 mg) is dried in a vacuum oven at 50 degrees Celsius for 12 hours, to reduce water oxygen adsorption. Then about 22 μL $Li_2S_8$ solution (0.3 M) is dropped into the dried carbon nanotube composite structure 10, corresponding to a sulfur loading of about 2.2 $mgcm^{-2}$. After evaporating the solvent at 50 degrees Celsius to obtain a CNT/SNC/$Li_2S_8$ three-dimensional positive electrode. For large-area positive electrode 20 that is suitable for pouch battery, the size can be 48 mm×48 mm, and the area sulfur loading can be 4.4 $mgcm^{-2}$ or 7 $mgcm^{-2}$.

Comparative Example

The 100 mg carbon nanotubes 12 from the super-aligned carbon nanotube array and 15 mg polyvinylpyrrolidone (PVP K90) are dispersed in ultrapure water and effectively sonicated for 30 min, to form the uniform carbon nanotube dispersion. Then the carbon nanotube dispersion is placed into the three-necked bottle with ice bath cooling, and magnetic stirring the carbon nanotube dispersion immediately. Then the carbon nanotube dispersion is placed into the petri-dish (diameter: 140 mm) and freezing-drying for several days, to form the CNT foam. The temperature of freezing-drying is about −76 degrees Celsius, and the vacuum degree is about 1 Pa.

The 20 mL 1, 2-dimethoxyethane/1, 3-dioxolane (DME/DOL, volume ratio 1:1) is placed in the flask. Then, according to the equation $Li_2S+7S \rightarrow Li_2S_8$, the commercial sulfur (1444 mg) and corresponding stoichiometric lithium sulfide powder ($Li_2S$, 276 mg) are placed in the flask. Then the flask is placed in the glove box that filled with argon gas. The solution in the flask is magnetically stirred at 50 degrees Celsius for 12 hours, and the two reactants completely react, to obtain 0.3 $molL^{-1}$ $Li_2S_8$ solution (positive electrode active material, brown). The CNT foam (diameter: 10 mm, average mass: 1.6 mg) is dried in the vacuum oven at 50 degrees Celsius for 12 hours, to reduce water oxygen adsorption. Then about 22 μL $Li_2S_8$ solution (0.3 M) is dropped into the dried CNT foam. After evaporating the solvent at 50 degrees Celsius to obtain a CNT/$Li_2S_8$ positive electrode.

The comparative example is similar to the specific example of the method for making the positive electrode 20 above except that the comparative example does not include the steps of adding the aniline solution and the ammonium persulphate aqueous solution, and also does not include the step of carbonization.

Referring to FIG. 11, the positive electrode 20 in the second embodiment includes a current collector and a positive electrode active material 22. The current collector is the carbon nanotube composite structure 10. The current collector includes the SNC layer 14 and the plurality of carbon nanotubes 12 entangled to each other, and the SNC layer 14 is coated on the outer surface of the each carbon nanotube 12. The intersected carbon nanotubes 12 are bonded together by the SNC layers 14. The positive electrode active material 22 is located on a surface of the SNC layers 14 away from the carbon nanotube 12. The SNC layers 14 is located between the carbon nanotube 12 and the positive electrode active material 22. The SNC layer 14 has good adsorption property to polysulfide. When the positive electrode active material 22 is the polysulfide, the sulfur (polysulfide) can be firmly fixed on the carbon nanotube 12.

Figure 12:
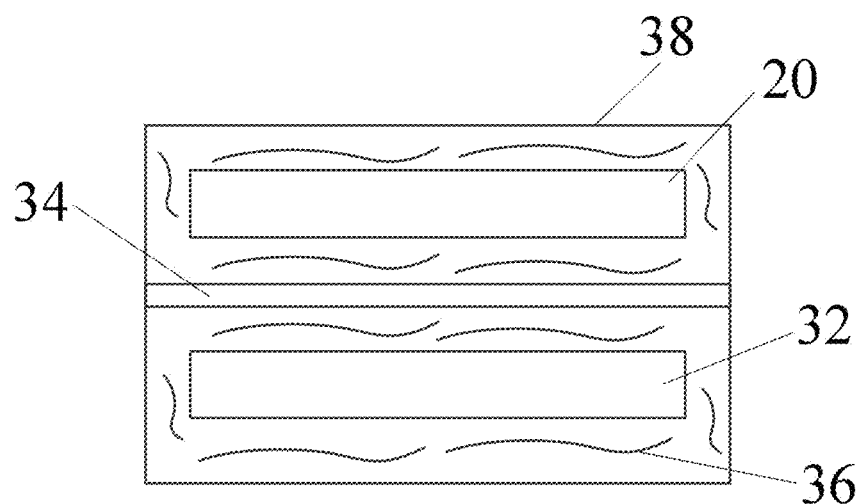
FIG. 12 schematically shows a third embodiment of a battery.

Referring to FIG. 12, a battery 30 of a third embodiment includes the positive electrode 20, a negative electrode 32, a separator 34, an electrolyte 36, and a shell 38. The shell 38 defines a space, and the positive electrode 20, the negative electrode 32, the separator 34, and the electrolyte 36 are located in the space. The separator 34 is located between the positive electrode 20 and the negative electrode 32. The positive electrode 20, the separator 34, and the negative electrode 32 are stacked in that order, and spaced apart from each other. The electrolyte 36 is located between the positive electrode 20, the separator 34, and the negative electrode 32. The positive electrode 20 includes the current collector and the positive electrode active material 22. The current collector is the carbon nanotube composite structure 10. The current collector includes the SNC layer 14 and the plurality of carbon nanotubes 12 entangled to each other, and the SNC layer 14 is coated on the outer surface of the each carbon nanotube 12. The intersected carbon nanotubes 12 are bonded together by the SNC layers 14. The SNC layer 14 is located between the carbon nanotube 12 and the positive electrode active material 22.

The positive electrode active material can be $Li_2S_6$ or $Li_2S_8$. The material of the negative electrode 32 is not limited, such as lithium, magnesium, zinc, or aluminum. The materials of the separator 34 and the electrolyte 36 are not limited and can be selected according to the positive electrode 20 and the negative electrode 32. The battery 30 can be a lithium-sulfur battery, a magnesium-sulfur battery, a zinc-sulfur battery, or an aluminum-sulfur battery.

In one embodiment, the battery 30 is a lithium sulfur battery; the separator 34 is Celgard 2400 modified with a nitrogen-doped carbon nanotube (NCNT), and the Celgard 2400 modified with the nitrogen-doped carbon nanotube can form a shuttled polysulfide double layer barrier, thereby further fixing sulfur; the material of the negative electrode 32 is lithium; and the electrolyte 36 is formed by dissolving 1 $molL^{-1}$ LiTFSI and 1 wt % $LiNO_3$ in DME and DOL, and the volume ratio of DME to DOL is 1:1. When the battery 30 is 2025 coin battery, the negative electrode 32 is a lithium piece with a diameter of 15.6 mm and a thickness of 450 microns. When the battery 30 is pouch battery, the negative electrode 32 is a lithium foil with a thickness of 100 microns, and the size of the lithium foil needs to match the positive electrode 20 being 48 mm×48 mm.

An appropriate amount of electrolyte 36 (calculated based on the ratio of the electrolyte 36 to sulfur) needs to be added to the battery system. For the pouch battery, the battery system is allowed to stand for 15 minutes before vacuum sealing, so that the electrolyte 36 is sufficiently immersed in the battery 30. In one embodiment, in the coil battery, the ratio of the electrolyte 36 to sulfur is that electrolyte 36:sulfur (volume mass) (E/S)=25:1. In another embodiment, in the pouch battery, the ratio of the electrolyte 36 to sulfur is that electrolyte 36:sulfur (volume mass) (E/S)=12:1, or electrolyte 36:sulfur (volume mass) (E/S)=15:1.

In one embodiment, the carbon nanotube composite structure 10 is cut into a sheet-like body with a diameter of 10 mm, then the $Li_2S_8$ solution (corresponding to about 2.2 $mgcm^{-2}$ sulfur) is added on the sheet-like body, and the CNT/SNC/S positive electrode is formed after evaporating the solvent; the negative electrode 32 is the lithium piece; the electrolyte 36 is formed by dissolving 1 $molL^{-1}$ LiTFSI and 1 wt % $LiNO_3$ in DME and DOL, and the volume ratio of DME to DOL is 1:1; the separator 34 is Celgard 2400 modified with the nitrogen-doped carbon nanotube (NCNT); and the positive electrode 20, the negative electrode 32, the electrolyte 36, and the separator 34 are located in the 2025 battery shell, to form a first coil battery. A CNT/S positive electrode is prepared by the same method above, and a second coil battery including the CNT/S positive electrode is formed. The first coil battery and the second coil battery have the same negative electrode 32, the same separator 34, the same electrolyte 36, and the same battery shell. Only positive electrodes 20 of the first coil battery and the second coil battery are different. In the first coil battery, the positive electrode 20 is the CNT/SNC/S positive electrode. In the second coil battery, the positive electrode 20 is the CNT/S positive electrode. For comparing the performances of the CNT/SNC/S positive electrode and CNT/S positive electrode, various characterization tests of the first coil battery and the second coil battery are performed.

Figure 13:
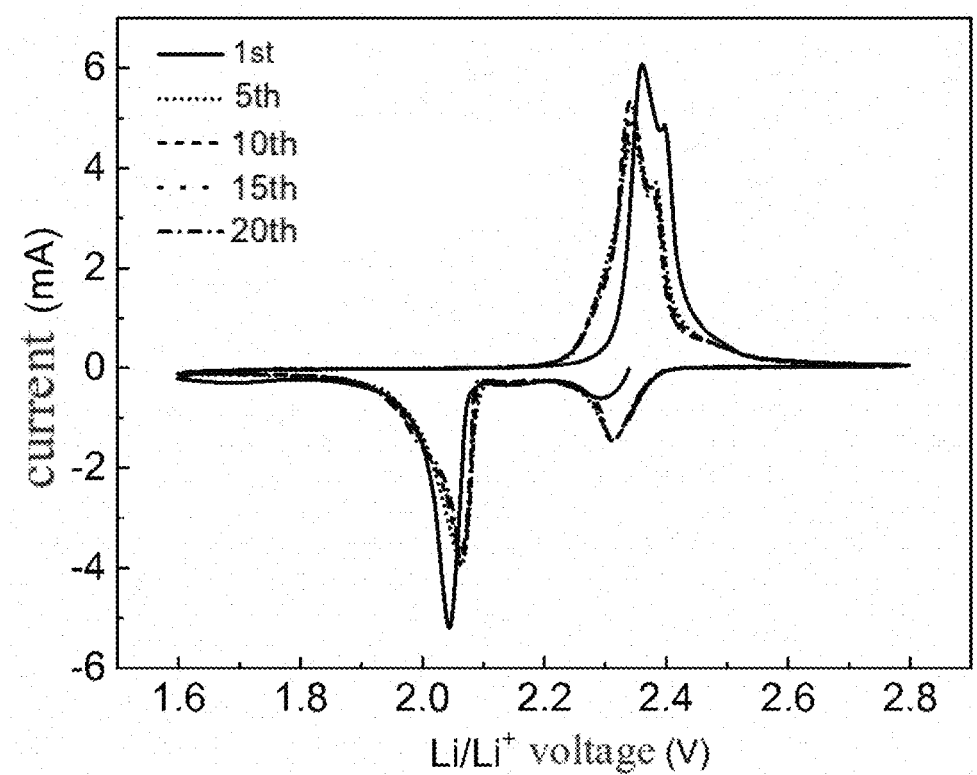
FIG. 13 shows cyclic voltammetry curves at different cycle numbers of the third embodiment of the positive electrode of a first coin battery.
Figure 14:
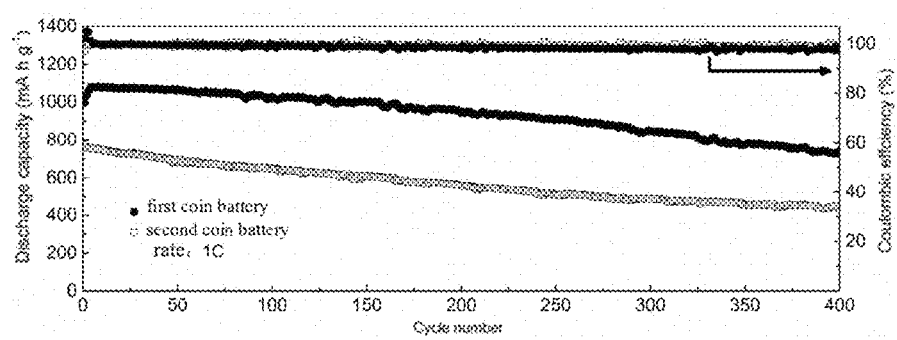
FIG. 14 shows cyclic specific capacity curves at 1 C of the third embodiment of the positive electrodes in the first coin battery and a second coin battery.

FIG. 13 shows cyclic voltammetry curves at different cycle numbers of CNT/SNC/S positive electrode of the first coin battery. Seen from FIG. 13, the cyclic voltammetry curves of the CNT/SNC/S positive electrode at the 20th cycle and the 1th cycle are almost the same, indicating the CNT/SNC/S positive electrode has good cycle performance. FIG. 14 shows cyclic specific capacity curves at 1 C of the CNT/SNC/S positive electrode in the first coin battery and the CNT/S positive electrode of the second coin battery. Seen from FIG. 14, the cyclic specific capacity of the CNT/SNC/S positive electrode is greater than the cyclic specific capacity of the CNT/S positive electrode in different cycle number, indicating the utilization rate of the positive electrode active material of the CNT/SNC/S positive electrode is greater than the utilization rate of the positive electrode active material of the CNT/S positive electrode.

Figure 15:
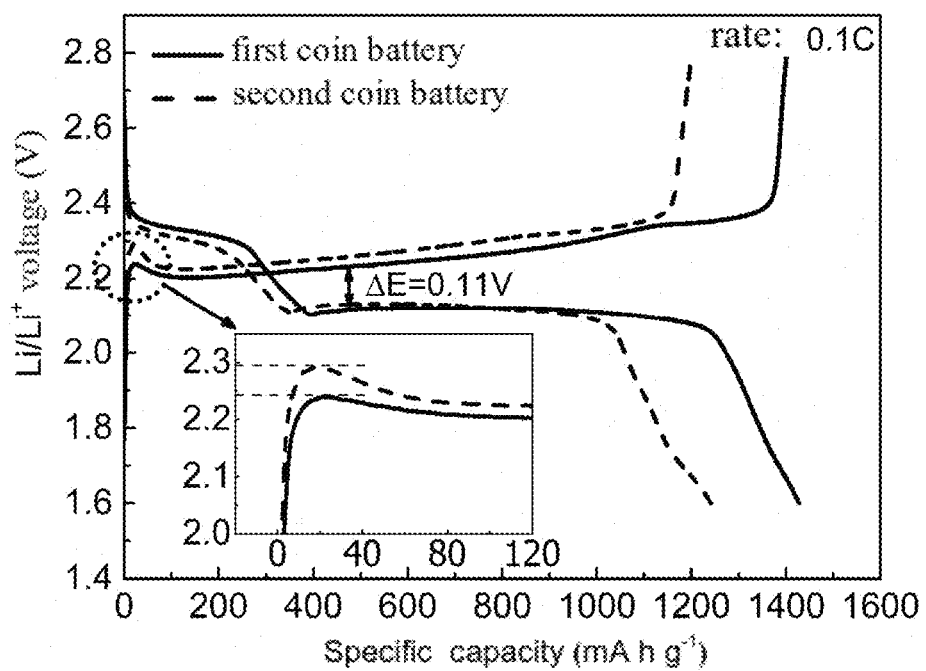
FIG. 15 shows charge and discharge voltage-specific capacity curves at 0.1 C of the third embodiment of the positive electrodes in the first coin battery and a second coin battery.

FIG. 15 shows charge and discharge voltage-capacity curves at 0.1 C of the first coin battery and the second coin battery. Seen from FIG. 15, the activation barrier of the CNT/SNC/S positive electrode is lower than the activation barrier of the CNT/S positive electrode, indicating the SNC layer 14 has a catalytic effect to the conversion of the discharge product lithium sulfide. The conversion of the discharge product lithium sulfide is catalyzed, improving the electrochemical reaction rate of the battery 30, thereby reducing the capacity fading. The capacity fading is reduced, thereby prolonging the cycle life of the battery 30. Thus, the problem of short cycle life caused by rapid capacity fading can be solved.

Figure 16:
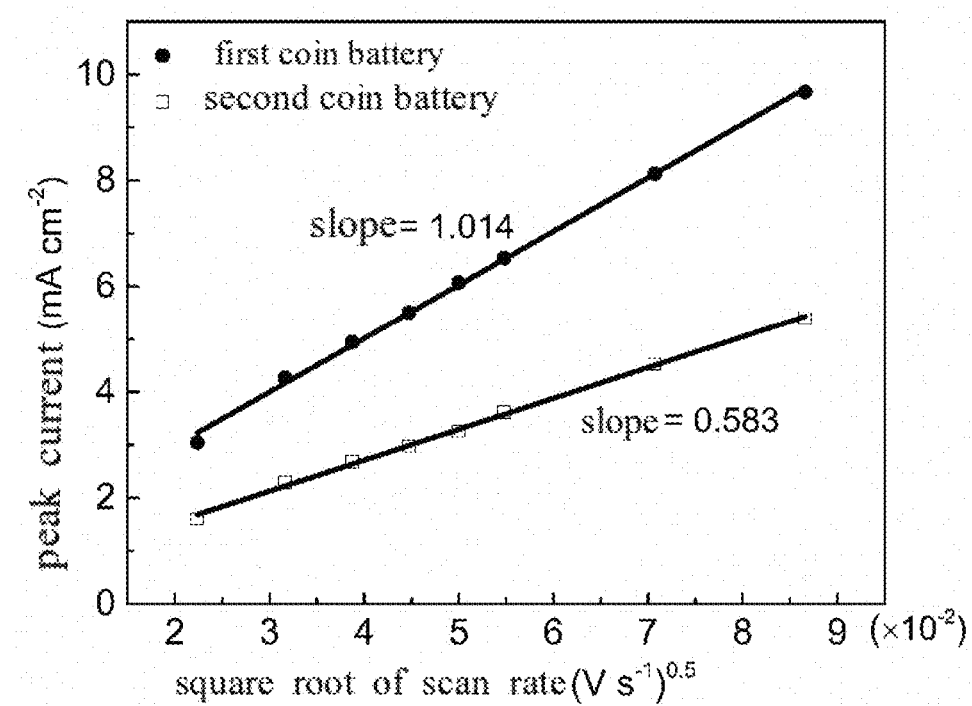
FIG. 16 shows square root of scan rate-peak current curves of the third embodiment of the positive electrodes in the first coin battery and a second coin battery.

FIG. 16 shows a comparative diagram of lithium ion diffusion coefficient analysis of the positive electrodes in the first coin battery and in the second coin battery. The absorption spectrum of FIG. 16 shows that the characteristic absorption peak corresponding to the sulfur substance sharply drops after standing for 3 hours, indicating the SNC layer 14 has good adsorption to polysulfide, and can fix sulfur on the carbon nanotubes 12, thereby enhancing the sulfur-loading effect of the battery 30. Referring again to FIG. 14, the SNC layer 14 coated on the carbon nanotubes 12 enhances the sulfur-loading effect of the battery 30, thus the utilization rate of the positive active material (sulfur) in the CNT/SNC/S positive electrode is higher than that of the positive active material (sulfur) in the CNT/S positive electrode.

In another embodiment, the carbon nanotube composite structure 10 is cut into a sheet-like body of 48 mm×48 mm, then the $Li_2S_8$ solution (corresponding to about 4.4 $mgcm^{-2}$ sulfur) is added on the sheet-like body, and the CNT/SNC/S positive electrode is formed after evaporating the solvent; the negative electrode 32 is the lithium piece; the electrolyte 36 is formed by dissolving 1 $molL^{-1}$ LiTFSI and 1 wt % $LiNO_3$ in DME and DOL, and the volume ratio of DME to DOL is 1:1; the separator 34 is Celgard 2400 modified with the nitrogen-doped carbon nanotube (NCNT); and the positive electrode 20, the negative electrode 32, the electrolyte 36, and the separator 34 are located in an aluminum shell, to form a first pouch battery.

Figure 17:
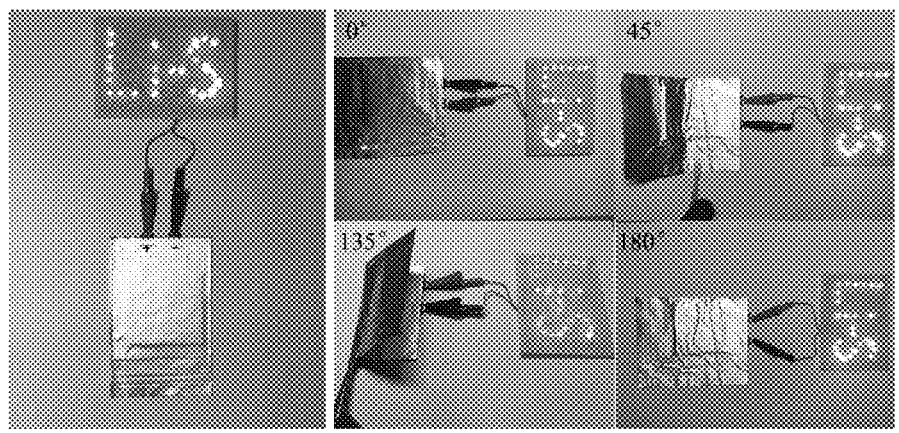
FIG. 17 shows optical images of the third embodiment of an LED battery pack illuminated by a first pouch battery with different bending angles.
Figure 18:
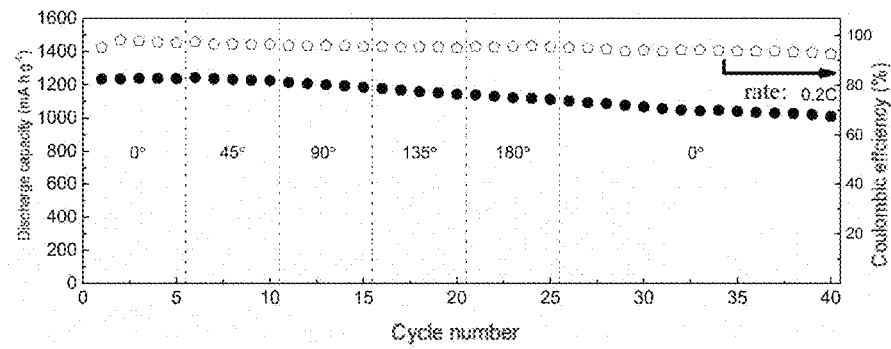
FIG. 18 shows cycle specific capacity curves of the third embodiment of the first pouch battery with different bending angles.

FIG. 17 shows optical images of an LED battery pack illuminated by the first pouch battery with different bending angles, wherein the inset figure shows the positive electrode of the first pouch battery. Seen from FIG. 17, when the first pouch battery is bent at 0°, 45°, 135°, or 180°, the first pouch battery can illuminate the LED battery pack. Thus, the first pouch battery has good flexibility, and any bend to the first pouch battery will not affect its use. FIG. 18 shows cycle specific capacity curves of the first pouch battery with different bending angles. Seen from FIG. 18, the first pouch battery has good charge and discharge performance at different bend angles.

Figure 19:
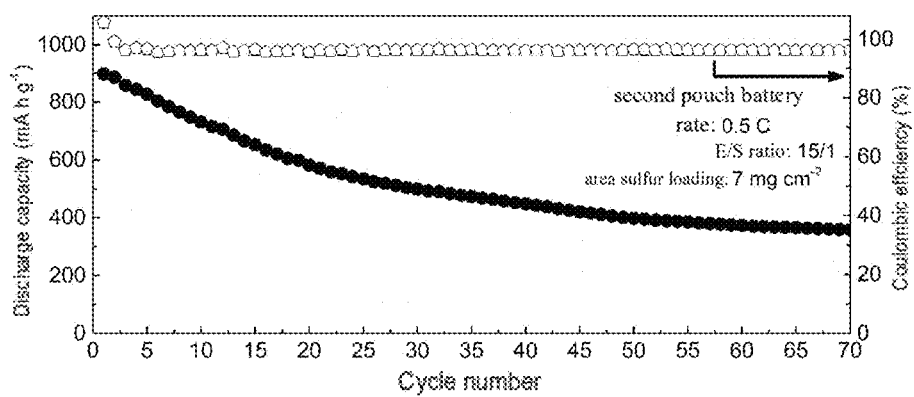
FIG. 19 shows cycle specific capacity curves of the third embodiment of a second pouch battery.

In yet another embodiment, the carbon nanotube composite structure 10 is cut into the sheet-like body of 48 mm×48 mm, then the $Li_2S_8$ solution (corresponding to about 7 $mgcm^{-2}$ sulfur) is added on the sheet-like body, and the CNT/SNC/S positive electrode is formed after evaporating the solvent; the negative electrode 32 is the lithium piece; the electrolyte 36 is formed by dissolving 1 $molL^{-1}$ LiTFSI and 1 wt % $LiNO_3$ in DME and DOL, and the volume ratio of DME to DOL is 1:1; the ratio of the electrolyte 36 to sulfur is that electrolyte 36:sulfur (volume mass) (E/S)=12:1, alternatively the ratio of the electrolyte 36 to sulfur is that electrolyte 36:sulfur (volume mass) (E/S)=15:1; the separator 34 is Celgard 2400 modified with the nitrogen-doped carbon nanotube (NCNT); and the positive electrode 20, the negative electrode 32, the electrolyte 36, and the separator 34 are located in the aluminum shell, to form a second pouch battery. FIG. 19 shows the cycle specific capacity curves of the second pouch battery. Seen from FIG. 19, the second pouch battery has good charge and discharge performance.

In summary, the carbon nanotube composite structure 10 and the method for making the same have the following advantages: 1) the SNC layer 14 is coated on each carbon nanotube 12 to form a coaxial carbon skeleton, the intersections of multiple carbon nanotubes 12 are bonded by the SNC layer 14, improving the stability of the carbon nanotube composite structure 10. Thus, the Young's modulus of the carbon nanotube composite structure 10 is 810.12 MPa, and the Young's modulus of the CNT foam without the SNC layer 14 is only 106.82 MPa; 2) the intersections of multiple carbon nanotubes 12 are bonded by the SNC layer 14, thereby introducing more active sites; 3) the carbon nanotube composite structure 10 has a carbon nanotube network structure, the conductive carbon nanotube network structure is capable of mitigating volume expansion of the electrode active material during lithiation process, and is capable of withstanding mechanical bending and folding of the electrode; 4) the SNC layer 14 has the catalytic effect to the conversion of the discharge product lithium sulfide, improving the electrochemical reaction rate of the battery 30 and reducing the capacity fading. Thus the cycle life of the battery 30 is prolonged; 5) the SNC layer 14 has good adsorption to polysulfides, and can fix sulfur on the carbon nanotubes 12, thereby enhancing the sulfur-loading effect of the battery 30. Thus the utilization rate of the active material (sulfur) is improved; 6) the flexible carbon nanotube composite structure 10 of the battery 30 can make the battery 30 have good flexibility, and any bending does not affect its use. In addition, the battery 30 still has good charge and discharge performance under different bending angles.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for making a positive electrode, the method comprising:
   dispersing a plurality of carbon nanotubes in water to form a carbon nanotube dispersion;
   adding an aniline solution into the carbon nanotube dispersion to form a mixed solution, wherein the aniline solution comprises an aniline;
   adding an initiator into the mixed solution to form a carbon nanotube composite structure preform;
   freeze-drying the carbon nanotube composite structure preform in a vacuum environment;
   carbonizing the carbon nanotube composite structure preform in a protective gas after freeze-drying, to form a carbon nanotube composite structure; and
   adding a positive electrode active material to the carbon nanotube composite structure.

2. The method of claim 1, wherein adding the initiator into the mixed solution comprises adding an ammonium persulphate water solution to the mixed solution.

3. The method of claim 1, wherein the initiator is an ammonium persulphate, and the aniline is polymerized to form a polyaniline under the action of the initiator; and during carbonizing the carbon nanotube composite structure preform in the protective gas, the ammonium persulphate is converted to nitrogen elements and sulfur elements, and the polyaniline is converted to nitrogen-doped carbon elements.

4. The method of claim 3, wherein during carbonizing the carbon nanotube composite structure preform in the protective gas, the ammonium persulphate and the polyaniline are converted to form a sulfur, nitrogen-codoped carbon layer.

5. The method of claim 1, wherein freeze-drying the carbon nanotube composite structure preform in the vacuum environment comprises:
   placing the carbon nanotube composite structure preform into a freeze drier, and cooling the carbon nanotube composite structure preform to a temperature lower than −50 degrees Celsius; and
   creating a vacuum environment in the freezer drier and increasing the temperature of the carbon nanotube composite structure preform to a room temperature in stages, wherein a time period of drying in each of the stages ranges from about 1 hour to about 10 hours, and the vacuum environment in the freeze drier ranges from about 1 Pa to about 10 Pa.

6. The method of claim 1, wherein the freeze-drying of the carbon nanotube composite structure preform is carried out at a temperature of freezing-drying about −76 degrees Celsius, and in a vacuum environment of about 1 Pa.

7. The method of claim 1, wherein the carbonizing of the carbon nanotube composite structure preform is carried out at a carbonization temperature ranging from about 800 degrees Celsius to about 1200 degrees Celsius.

8. The method of claim 1, wherein adding the positive electrode active material to the carbon nanotube composite structure comprises:
   dissolving the positive electrode active material in an organic solvent to form a positive electrode active material solution;
   adding the positive electrode active material solution to the carbon nanotube composite structure; and
   removing the organic solvent.

9. The method of claim 8, wherein the positive electrode active material is $Li_2S_6$ or $Li_2S_8$, and the organic solvent is 1, 2-dimethoxyethane and 1, 3-dioxolane mixture.

10. A positive electrode, comprising:
    a positive electrode active material; and
    a current collector, wherein the current collector comprises a carbon nanotube network structure and a sulfur, nitrogen-codoped carbon layer, the carbon nanotube network structure comprises a plurality of carbon nanotubes entangled to each other, the sulfur, nitrogen-codoped carbon layer is coated on outer surfaces of the plurality of carbon nanotubes and intersections of the plurality of carbon nanotubes, and the plurality of carbon nanotubes are bonded together at the intersections by the sulfur, nitrogen-codoped carbon layer; and the sulfur, nitrogen-codoped carbon layer comprises sulfur elements formed by carbonizing an ammonium persulphate.

11. The positive electrode of claim 10, wherein the positive electrode active material is located on a surface of the sulfur, nitrogen-codoped carbon layer away from the plurality of carbon nanotubes.

12. The positive electrode of claim 10, wherein the sulfur, nitrogen-codoped carbon layer is located between the plurality of carbon nanotubes and the positive electrode active material.

13. The positive electrode of claim 10, wherein the positive electrode active material is a polysulfide.

14. The positive electrode of claim 10, wherein the sulfur, nitrogen-codoped carbon layer comprises nitrogen elements, sulfur elements, and carbon elements.

15. A battery, comprising:
    a negative electrode, a separator, an electrolyte, a shell, and a positive electrode; wherein the positive electrode comprises:
    a positive electrode active material; and
    a current collector, wherein the current collector comprises a carbon nanotube network structure and a sulfur, nitrogen-codoped carbon layer, the carbon nanotube network structure comprises a plurality of carbon nanotubes entangled to each other, the sulfur, nitrogen-codoped carbon layer is coated on outer surfaces of the plurality of carbon nanotubes and intersections of the plurality of carbon nanotubes, and the plurality of carbon nanotubes are bonded together at the intersections by the sulfur, nitrogen-codoped carbon layer; and the sulfur, nitrogen-codoped carbon layer comprises sulfur elements formed by carbonizing an ammonium persulphate.

16. The battery of claim 15, wherein the positive electrode active material is located on a surface of the sulfur, nitrogen-codoped carbon layer away from the plurality of carbon nanotubes.

17. The battery of claim 15, wherein the sulfur, nitrogen-codoped carbon layer is located between the plurality of carbon nanotubes and the positive electrode active material.

18. The battery of claim 15, wherein the positive electrode active material is a poly sulfide.

19. The battery of claim 15, wherein the sulfur, nitrogen-codoped carbon layer comprises nitrogen elements, sulfur elements, and carbon elements.

20. The battery of claim 15, wherein a material of the negative electrode is lithium, magnesium, zinc, or aluminum.

* * * * *